United States Patent [19]
Schmidt et al.

[11] Patent Number: 5,731,091
[45] Date of Patent: Mar. 24, 1998

[54] PROCESS FOR PRODUCING FUNCTIONAL VITREOUS LAYERS

[75] Inventors: Helmut Schmidt, Saarbrücken; Martin Mennig, Quierschied; Thomas Burkhart, Walluf; Claudia Fink-Straube, Saarbrücken; Gerhard Jonschker, Spiensen-Elversberg; Mike Schmitt, Hennef; Annette Bauer, Herrlingen, all of Germany

[73] Assignee: Institut Fuer Neue Materialien Gemeinnuetzige GmbH, Saarbruecken, Germany

[21] Appl. No.: 635,971

[22] PCT Filed: Oct. 18, 1994

[86] PCT No.: PCT/EP94/03423

§ 371 Date: Aug. 1, 1996

§ 102(e) Date: Aug. 1, 1996

[87] PCT Pub. No.: WO95/13249

PCT Pub. Date: May 18, 1995

[30] Foreign Application Priority Data

Nov. 10, 1993 [DE] Germany .................. 43 33 360.2

[51] Int. Cl.$^6$ ........................................... B05D 5/06
[52] U.S. Cl. .................. 428/428; 428/432; 427/168; 427/169; 427/226; 427/397.7; 501/12; 106/287.34; 252/315.6
[58] Field of Search ....................... 427/162, 164, 427/165, 168, 169, 386, 388.1, 388.2, 388.4, 389.7, 393.6, 397.7, 387, 226; 252/315.2, 315.6; 106/287.11, 287.12, 287.13, 287.14, 287.16, 287.34; 501/12; 428/428, 432

[56] References Cited

U.S. PATENT DOCUMENTS

| | | | |
|---|---|---|---|
| 4,556,605 | 12/1985 | Mogami et al. | 428/331 |
| 5,093,286 | 3/1992 | Nogami et al. | 501/17 |
| 5,182,143 | 1/1993 | Holmes-Farley et al. | 427/409 |

FOREIGN PATENT DOCUMENTS

| | | |
|---|---|---|
| 452922 | 10/1991 | European Pat. Off. . |
| 19511627 | 10/1995 | Germany . |
| 52-55636 | 10/1983 | Japan . |
| 59-43070 | 3/1984 | Japan . |
| 59-115366 | 7/1984 | Japan . |
| 2069585 | 3/1990 | Japan . |
| 2070776 | 3/1990 | Japan . |
| 2115801 | 4/1990 | Japan . |

OTHER PUBLICATIONS

Reisfeld, SPIE vol. 1328, Sol–Gel Optics, 1990, pp. 29–39.
Schmidt et al, pp. 651–660, in "Ultrastructure Processing of Advanced Ceramics", Edited by J.D. Mackenzie and D.R. Ulrich, John Wiley and Sons, New York, 1988.

Reisfeld et al, Proc. SPIE–Int. Soc. Opt. Eng. (1992), 1725 (Opt. Mater. Technol. Energy Effic. Sol. Energy Convers.XI), pp. 299–305.

Zink et al, ACS Symp. Ser. (1991), 455 (Mater. Nonlinear Opt.), pp. 541–552.

Badini et al, Rev. Sci. Instrum. (1995), 66(8), pp. 4034–4040.

Eyal et al, Chemical Physics Letters, vol. 176, No. 6, Feb. 1991, pp. 531–535.

Yariv et al, Proc. SPIE—Int. Soc. Opt. Eng. (1993), 1972 (Opto–Electronics and Applications in Industry and Medicine), pp. 46–54.

Schmidt, J. of Sol–Gel Science and Technology, 6181, No. 3, 1994, pp. 217–231.

*Primary Examiner*—Erma Cameron
*Attorney, Agent, or Firm*—Oblon, Spivak, McClelland, Maier & Neustadt, P.C.

[57] ABSTRACT

To produce functional vitrous, preferably colored or colloid-dyed layers, a composition produced by hydrolysis and polycondensation of (A) at least on hydrolyzable silane of general formula (I)

$$SiX_4 \qquad (I)$$

wherein the radicals X are the same or different and represent hydrolyzable groups or hydroxy groups, or an oligomer derived therefrom, and (B) at least one organosilane of general formula (II)

$$R^1{}_a R^2{}_b SiX_{(4-a-b)} \qquad (II)$$

wherein $R^1$ is a non-hydrolyzable radical, $R^2$ represents a radical carrying a functional group, X has the meaning given above, and a and b have the values 0, 1, 2 or 3, the sum (a+b) having the values 1, 2 or 3, or an oligomer derived therefrom with an (A):(B) substance ratio of 5–50:50–95, and optionally (C) one or more compounds of glass-forming elements, is mixed with at least one function carrier from the group of temperature-stable dyes or pigments, metallic or non-metallic oxides, coloring metallic ions, metallic or metallic compound colloids, and metal ions that react under reduction conditions to form metallic colloids;

the composition mixed with the function carrier is applied onto a substrate and the coating is thermally condensed to form a vitreous layer.

15 Claims, No Drawings

PROCESS FOR PRODUCING FUNCTIONAL VITREOUS LAYERS

The invention relates to a process for producing functional vitreous, preferably colored or colloid-dyed layers on substrates.

Particularly, the invention relates to a process for producing functional vitreous layers on substrates, which process is characterized in that a composition obtainable by hydrolysis and polycondensation of (A) at least on hydrolyzable silane of general formula (I)

$$SiX_4 \qquad (I)$$

wherein the radicals X are the same or different and represent hydrolyzable groups or hydroxy groups, or an oligomer derived therefrom, and (B) at least one organosilane of general formula (II)

$$R^1{}_a R^2{}_b SiX_{(4-a-b)} \qquad (II)$$

wherein $R^1$ is a non-hydrolyzable radical, $R^2$ represents a radical carrying a functional group, X has the meaning given above, and a and b have the values 0, 1, 2 or 3, the sum (a+b) having the values 1, 2 or 3, or an oligomer derived therefrom in a weight ratio (A):(B) of 5–50:50–95, as well as (C) optionally, one or more compounds of glass-forming elements, is mixed with at least one function carrier from the group of temperature-stable dyes and pigments, oxides of metals or nonmetals, coloring metal ions, colloids of metals or metal compounds as well as metal ions capable of reacting under reducing conditions to form metal colloids, the composition admixed with said function carrier is applied onto a substrate and the coating is densified thermally to form a vitreous layer.

The coating system according to the present invention is based on the surprising finding that despite its relatively high proportion of organic (carbon-containing) components the composition applied onto said substrate may be subjected to a thermal densification at high temperatures without the occurence of cracking or loss of transparency. In said process a steady transformation from an organically modified glass to a completely inorganic (carbon-free) $SiO_2$ glass takes place. The function carriers introduced, e.g., metal colloids, retain their function (light absorption, light scattering, photochromy, catalysis, etc.) and, for example in the case of metal colloids, result in intensively colored vitreous layers. The fact that it is possible to carry out the thermal densification at relatively high temperatures allows the production of crack-free coatings having a high thermal, mechanical and chemical stability on surfaces of metal, glass and ceramics.

In the hydrolyzable silanes (A) and the organosilanes (B) examples of hydrolyzable groups X are hydrogen or halogen (F, Cl, Br or I), alkoxy (preferably $C_{1-6}$ alkoxy such as, e.g., methoxy, ethoxy, n-propoxy, i-propoxy and butoxy), aryloxy (preferably $C_{6-10}$ aryloxy such as phenoxy), acyloxy (preferably $C_{1-6}$ acyloxy such as acetoxy or propionyloxy), alkylcarbonyl (preferably $C_{2-7}$ alkylcarbonyl such as acetyl), amino, monoalkylamino or dialkylamino having 1 to 12, particularly 1 to 6 carbon atoms.

Examples of the non-hydrolyzable radicals $R^1$ are alkyl (preferably $C_{1-6}$ alkyl such as methyl, ethyl, n-propyl, isopropyl, n-butyl, s-butyl, and t-butyl, pentyl, hexyl or cyclohexyl), alkenyl (preferably $C_{2-6}$ alkenyl such as vinyl, 1-propenyl, 2-propenyl, and butenyl), alkynyl (preferably $C_{2-6}$ alkynyl such as acetylenyl and propargyl), and aryl (preferably $C_{6-10}$ aryl such as phenyl and naphthyl). Said radicals $R^1$ and X may optionally have one or more conventional substituents such as, e.g., halogen or alkoxy.

Specific examples of the functional groups of the radical $R^2$ are epoxy, hydroxy, ether, amino, monoalkylamino, dialkylamino, amide, carboxy, mercapto, thioether, vinyl, acryloxy, methacryloxy, cyano, halogen, aldehyde, alkylcarbonyl, sulfonic acid and phosphoric acid groups. Said functional groups are bonded to the silicon atom via alkylene, alkenylene or arylene bridging groups which may be interrupted by oxygen or sulfur atoms or -NH groups. Said bridging groups are derived from the above-mentioned alkyl, alkenyl or aryl radicals. The radicals $R^2$ preferably contain 1 to 18, particularly 1 to 8 carbon atoms.

In general formula (II) a preferably is 0, 1 or 2, b preferably is 1 or 2, and the sum (a+b) preferably is 1 or 2.

Particularly preferred hydrolyzable silanes (A) are tetraalkoxysilanes such as tetraethoxysilane (TEOS). Particularly preferred organosilanes are epoxysilanes such as 3-glycidyloxypropyl-trimethoxysilane (GPTS), and aminosilanes such as 3-aminopropyl-triethoxysilane and 3-(aminoethylamino)-propyl-triethoxysilane (DIAMO).

The weight ratio of the hydrolyzable silane (A) to the organosilane (B) is 5 to 50:50 to 95, preferably 15 to 25:75 to 85.

The optional component (C) is preferably soluble or dispersible in the reaction medium. Examples of employable compounds (halides, alkoxides, carboxylates, chelates, etc.) are those of lithium, sodium, potassium, rubidium, cesium, beryllium, magnesium, calcium, strontium, barium, boron, aluminum, titanium, zirconium, tin, zinc or vanadium. The hydrolysis and polycondensation is conducted either in the absence of a solvent or, preferably, in an aqueous or aqueous/organic reaction medium, optionally in the presence of an acidic or basic condensation catalyst such as HCl, $HNO_3$ or $NH_3$. If a liquid reaction medium is employed the starting components are soluble in said reaction medium. Suitable organic solvents particularly are water-miscible solvents such as monohydric or polyhydric aliphatic alcohols, ethers, esters, ketones, amides, sulfoxides, and sulfones.

Preferably the hydrolysis and polycondensation take place under the conditions of the sol-gel process, wherein the reaction mixture in the form of a viscous sol is used for coating the substrate.

Optionally, the hydrolysis and polycondensation are carried out in the presence of a complexing agent, e.g., nitrates, β-dicarbonyl compounds (e.g. acetylacetonates or acetoacetic esters), carboxylic acids (e.g. methacrylic acid), or carboxylates (e.g. acetate, citrate, or glycolate), betains, dioles, diamines (e.g. DIAMO™), or crown ethers.

The sol obtained is mixed with at least one molecular disperse or nanoscale function carrier from the group of temperature-stable dyes and pigments, oxides of metals or non-metals, coloring metal ions, colloids of metals or metal compounds, and metal ions capable of reacting under reducing conditions to form metal colloids.

Examples of temperature-stable dyes are azo dyes such as Methyl Orange, Alizarin Yellow or Kongo Red; dispersed dyestuffs such as Disperse Red; triphenylmethane dyes such as Malachite Green, Eosine, Fluorescein, Aurine, and Phenolthalein; vat dyestuffs such as Indigo, Thioindigo, and anthraquinone dyes; perylene dyes as well as fluorescent dyes such as Fluorescent Brightener 28. Examples of utilizable pigments are phthalocyanine having, e.g., Cu, Co, Ni, Zn or Cr as central atom; carbon black pigments having a particle diameter below 500 nm.

Examples of suitable metal or non-metal oxides are $SiO_2$, $TiO_2$, $ZrO_2$, $Al_2O_3$, $Fe_2O_3$, $Cr_2O_3$, $CuO$, $Cu_2O$, $ZnO$, $Mn_2O_3$, $SnO_2$, $PdO$, and $In_2O_3$. Said metal or non-metal oxides preferably have a particle diameter of from 1 to 100 nm.

The coloring metal ions are preferably in the form of water-soluble salts such as nitrates or halides of, e.g., $Mn^{2+}$, $Co^{2+}$, $Fe^{3+}$ or $Cr^{3+}$.

As metal colloids, those of Ag, Cu, Au, Pd, and Pt are particularly suitable. These usually have particle diameters of from 1 to 100 nm, i.e., of from 1 to 20 nm in the case of transparent layers and of from 20 to 100 nm in the case of light-scattering layers, respectively.

Examples of suitable metal compounds in colloidal form are metal halides such as $AgCl$, $AgBr$, $AgCl_xBr_{1-x}$, and $CuCl$, metal carbides such as $TiC$ and $B_4C$, metal nitrides such as $BN$ and $TiN$, metal arsenides such as $Cd_3As_2$, metal phosphides such as $Cd_3P_2$, chalcogenides (sulfides, selenides, tellurides) such as $AgS$, $CdS$, $HgS$, $PbS$, and $ZnS$; $CdSe$, $ZnSe$, $CdTe$; and mixed phases such as $ZnSe/PbS_2$ and $CdS/PbS_2$.

The metal compounds have a particle diameter of preferably from 1 to 100 nm, particularly from 1 to 50 nm, and particularly preferred from 2 to 30 nm.

The amount of function carrier is determined by the desired functional properties of the coating, e.g., the desired color intensity or opacity.

The colloid of a metal or metal compound may optionally be employed in precomplexed form. In this case the complexing agents mentioned above may, for example, be employed.

The sol admixed with the function carrier is applied onto the substrate according to conventional coating methods, optionally after the viscosity of the sol has been adjusted by adding or removing a solvent. Applicable techniques are, e.g., dip-coating, casting, spinning, spraying or brushing. In comparison to conventional TEOS sols, the sol prepared according to the present invention shows the advantage of a very long pot-life. Furthermore, inhomogeneities in the coating (uneven thickness) have a less drastic effect on the optical quality of the layer since in the thermal densification no cracking takes place.

Suitable substrates are, e.g., those of metals such as stainless steel, copper, brass and aluminium; glasses such as float glass, borosilicate glass, lead crystal or flint glass; and ceramics such as $Al_2O_3$, $ZrO_2$, $SiO_2$ mixed oxides or also enamel.

The coating obtained is optionally dried and thereafter densified thermally to form a vitreous layer. Said densification can be carried out at temperatures above 250° C., preferably above 400° C., and particularly preferred above 500° C., up to below the softening or decomposition temperature of the substrate. The thermal densification can be conducted in air or in an inert gas such as nitrogen or argon. The thermal treatment may optionally also be carried out by IR or laser radiation. Moreover, it is possible to produce structured coatings by selective exposure to heat.

The following examples illustrate the present invention.

PREPARATION EXAMPLE

Preparation of a Basic GPTS/TEOS Sol

In order to synthesize the sol, 160 g of 3-glycidyloxypropyltrimethoxy silane (GPTS) and 40 g of tetraethoxy silane (TEOS) are mixed with 120 ml of ethanol and are heated to 60° C. with stirring (molar ratio 80:20). To said mixture, 28.5 g of water and 0.5 ml of concentrated $HNO_3$ are added and stirring is carried out at 60° C. for 15 hrs. The sol thus obtained is diluted with 150 ml of ethanol and may be employed as coating solution for several weeks.

EXAMPLE 1

Production of a Light-Scattering, Opal Glass-Like Layer

To the basic sol, 2 g $TiO_2$ powder P25™ (Degussa AG) are added and homogenized for 5 minutes by means of an ultrasonic disintegrator. Substrates of float glass are coated by dipping them into said sol (drawing speed 2–15 mm/s) and subsequently are densified thermally at 100°–500° C. There is obtained a mat, light-scattering layer having a thickness of about 2 μm and showing the same optical appearance as opal glass and remaining crack-free up to the densification temperature of 500° C.

EXAMPLE 2

Production of a Layer Having a Nacreous Luster

To the basic sol there are added with stirring 2.5 g of Iriodin® luster pigment (Merck, Darmstadt) and 0.1 g of Aerosil® 300 (Degussa AG). The mixture is homogenized for 5 minutes by means of an ultrasonic disintegrator, and thereafter is cooled to room temperature in an ice bath. Microscopic slides are coated with said coating solution by dipping at drawing speeds of 2–20 mm/s and are thermally densified at temperatures of between 100° and 500° C. Densification at 100° C. results in a flexible, soft coating, whereas the coating obtained at 500° C. has a glass-like hardness. All of said coatings show an optically attractive nacreous luster.

EXAMPLE 3

Production of a Glossy Coating on Copper

The basic sol is applied onto alkali-cleaned copper platelets by dip-coating at drawing speeds of from 2 to 4 mm/s, and thermally densified under argon at 200° C. The substrates show a coating having a thickness of about 1–2 μm and a gold-like luster.

EXAMPLE 4

Production of a Mat Coating on Stainless Steel

After the reaction, 300 g Aluox C® (Degussa) are added to the basic sol, and the powder is dispersed into the sol for 6 minutes by means of a disintegrator (Branson). Thereby, a particle-containing sol which after cooling to room temperature may be used for coating operations is obtained.

The drawing speeds for applying coatings on stainless steel 1.4301 (DIN 17440) are in the range of 1–4 mm/s. A mat, rough coating is obtained on said stainless steel sheets, which coating may be heated at temperatures of 500°–700° C. without giving rise to cracks. In an inert gas atmosphere (argon) the tarnishing of the stainless steel is prevented. The layer thicknesses are 3–3.5 μm after thermal densification at a heating rate of 1 K/min.

EXAMPLE 5

Production of a Dark Brown Coating on Glass

In 120 ml of ethanol, 160 g of GPTS, 40 g of TEOS, 43.6 g of $Mn(NO_3)_2 \cdot 6 H_2O$ are mixed and heated to 60° C., followed by the addition of 12 g of water and 0.5 g of concentrated $HNO_3$. The solution is stirred at said temperature for 15 hrs, and subsequently the sol is diluted with 150 ml of ethanol.

Microscopic slides are dipped into said solution and pulled out therefrom at drawing speeds of 2–4 mm/s. The coatings obtained are aged at 500° C. and then contain a proportion of 20% by wt. of $MnO_2$. This results in a dark brown color.

For the production of iron oxide-containing coatings, 66.7 g of $Fe(NO_3)_3 \cdot 9\ H_2O$ are started with, and following the adjustment of the temperature to 60° C., 1.7 g of water are added. Application and densification are carried out in the same way as in the case of the $MnO_2$-containing coatings. This also results in the obtainment of dark brown coatings having 20% by wt. of $Fe_2O_3$.

EXAMPLE 6

Production of Colored, High Temperature Resistant Layers

In 10 ml of ethanol, 5 g of phthalocyanine are dissolved. Said ethanolic dye solution is slowly added to 10 ml of the basic sol and mixed therewith. After filtration through a 0.2 μm filter the sol formed may be used for coating operations. The coatings are heated at temperatures of up to 400° C. Depending on the type of complex, different colors are obtained. For example, Cu-phthalocyanine provides a blue coating on glass.

EXAMPLE 7

Production of Photochromic Layers

For preparing the sol, 10 ml of ethanol and 10 ml of basic sol and/or prehydrolyzed GPTS/TEOS of the ratios 0:1 to 1:0 are mixed at room temperature.

Then, 0.4–2 g of $AgNO_3$ and 1–20 ml of DIAMO™ are added and stirred until they are completely dissolved. To the clear solution, 0.003–0.8 g of $K_3[Cu(CN)_4]$ are added. In order to form AgCl in said coatings, 0.48–12 ml of 3-chloropropyltrimethoxy silane are added to the sol reaction mixture.

In the case of silver bromide-containing coatings, α,ω-dibromoalkanes having a chain length of at least 8 carbon atoms may be employed such as, e.g., 1,8-dibromooctane or 1,10-dibromodecane. For forming $AgCl_xBr_{1-x}$ mixed crystallites, 3-chloropropyl-trimethoxy silane as well as 1,8-dibromooctane are used (x ranging from 0.25 to 0.75).

After stirring for 10 to 30 minutes the sol is ready for application. The coating operation is effected by dipping. For said purpose the substrates are dipped into the sol solution, left standing therein for 30 s, and pulled out at rates of 1–7.5 mm/s.

Following the drying of the coatings at 65° C. for 1 hr the coatings are heated to 280°–350° C. in normal atmosphere at 1–3 K/min and are aged at the final temperature for 10 min to 5 hrs. The cooling of the coatings to room temperature was carried out for 10 min to 10 hrs.

In order to study the photochromic effect, the coatings having a thickness of 0.2–1.0 μm are irradiated by means of a 750 W Hg-Xe lamp at a distance of 40 cm with respect to the lamp. After 1–20 min this results in the coatings becoming dark colored. Thereby, the transmission is reduced by The dark colored coatings do not regenerate at room temperature and a brightening is achieved only at temperatures of from 100° C. upwards. The complete decolorization is achieved following a thermal treatment at 200° C. for 15 min to 1 hr. The size of the silver halide crystals, determined by X-ray measurements, is 5–25 nm in terms of diameter.

EXAMPLE 8

Production of Coatings Containing Gold, Silver, Gold/Silver, Copper, Platinum, and Palladium Colloids 1. Gold colloid-containing coating on glass substrate In 4 ml of ethanol, 0.31 g of $H[AuCl_4] \cdot 2\ H_2O$ are dissolved. To said solution, 0.18 g of DIAMO™, dissolved in 1 ml of ethanol, are added dropwise. The gold precomplexed in this manner is then added dropwise to 20 ml of prehydrolyzed GPTS/TEOS basic sol into which 1.58 ml of DIAMO™ had previously been stirred. In this manner any gold-stabilizer-ratio (molar ratio of Au to stabilizer tested up to 1:30) may be achieved. The complex mixture is stirred for 30 minutes and subsequently filtered through 1.2 and 0.8 μm filters. The sol obtained is used for coating microscopic slides by dipping. Initially the coatings have a light yellow color. At temperatures between 80° C. and 150° C. the gold is reduced by ethanol to form the colloid. The coating is eventually densified at temperatures of up to 500° C. under an atmosphere of air. The obtained coatings are transparent and crack-free, and depending on the size of the colloid have a red, purple or bluish purple color.

2. Silver colloid-containing coating on glass substrate

In 3.3 ml of DIAMO™ and 3 ml of ethanol, 0.51 g of $AgNO_3$ are dissolved. The obtained solution is stirred into 20 ml of prehydrolyzed GPTS/TEOS basic sol, stirred for 30 minutes and subsequently filtered through 1.2 and 0.8 μm filters. The obtained sol having a light yellow color is used to coat microscopic slides by dip-coating. The reduction of the silver ions to form colloids is effected by means of ethanol while heating the coatings at temperatures of up to 500° C. under an atmosphere of air. The crack-free, transparent coatings have a yellow to yellowish brown color.

3. Gold/silver colloid-containing coating on glass substrate

In 2 ml of DIAMO™ and 2 ml of ethanol, 0.32 g of $AgNO_3$ are dissolved and the resulting mixture is stirred into 20 ml of prehydrolyzed GPTS/TEOS basic sol.

$H[AuCl_4] \cdot 2\ H_2O$ (0.41 g) is dissolved in 4 ml of ethanol, and to the resulting solution 0.23 g of DIAMO™ dissolved in 1 ml of ethanol are added dropwise. The solution obtained is stirred into 20 ml of prehydrolyzed GPTS/TEOS sol.

Then, the silver-containing sol is added dropwise to the gold-containing sol and stirred for 30 minutes. The complex mixture is stirred for 30 minutes and subsequently filtered through 1.2 and 0.8 μm filters. Initially the coatings are of a light yellowish orange color. The reduction of the gold and silver ions to form the colloid is effected by means of ethanol at temperatures between 80° C. and 140° C. under an atmosphere of air. The transparent coatings may be heated up to 500° C. without giving rise to cracks and are of an apricot color.

4. Copper colloid-containing coatings 4.1. $CuSO_4$ as precursor $CuSO_4$ (0.4 g) is dissolved in 4 ml of DIAMO™ and 5 ml of an alcohol mixture and stirred for 5 hours. The formed solution is added to 10 ml of prehydrolyzed GPTS/TEOS basic sol and stirred for a further 30 minutes and is subsequently filtered through a 1.2 μm filter. With the obtained sol microscopic slides are dip-coated and predried at 80° C., the coatings having a slightly dark blue color. The reduction of the copper to form the colloid is effected under Formier gas (92% by volume of $N_2$, 8% by volume of $H_2$) at temperatures between 400° C. and 500° C. The crack-free, transparent coatings obtained are of red color.

4.2. $Cu(NO_3)_2 \cdot 3\ H_2O$ as precursor $Cu(NO_3)_2 \cdot 3\ H_2O$ (0.70 g) is dissolved in 5 ml of ethanol and added to 5 ml of a DIAMO™-ethanol mixture (1 ml of DIAMO™, 5 ml of ethanol). Said mixture is stirred into 10 ml of prehydrolyzed GPTS/TEOS basic sol, stirred for another 30 minutes and subsequently filtered through 1.2 and 0.8 µm filters. Microscopic slides are dip-coated with the obtained sol and predried at 80° C., the coatings having a slightly dark blue color. The reduction of the copper to form the colloid is effected under Formier gas (92% by volume of $N_2$, 8% by volume of $H_2$) at temperatures between 400° C. and 500° C. The crack-free, transparent coatings obtained are of red color.

5. Platinum colloid-containing coating $H_2[PtCl_6].2 H_2O$ (0.41 g) is dissolved in 5 ml of ethanol and added dropwise to 0.67 ml of a DIAMO™. The solution formed is stirred into 20 ml of prehydrolyzed GPTS/TEOS basic sol, stirred for another 30 minutes and subsequently filtered through 3.0 and 1.2 µm filters. Microscopic slides are dipcoated with the obtained sol and predried at 80° C., the coatings having a light yellow color. The reduction of the platinum to form the colloid and the curing of the coatings is effected under Formier gas (92% by volume of $N_2$, 8% by volume of $H_2$) at temperatures between 400° C. and 500° C. Following aging, the crack-free and transparent coatings obtained show a grayish brown color.

6. Palladium colloid-containing coatings on substrates of glass and ceramics

X mg of $Pd(ac)_2$ and $Pd(NO_3)_2$, respectively (X=100–400 g) are dissolved in acetone. A mixture of DIAMO™ and 5 ml of ethanol is added to the orange yellow and brown, respectively transparent solution. The molar ratio of DIAMO™ and the Pd starting material may vary between 3:1 and 12:1. To the reaction mixture, there is added 0–50 ml of GPTS/TEOS basic sol (depending on the desired concentration of Pd). After having distilled off the solvent at 30° C. (100 mbar) for 5 min in an aspirator vaccum by means of a membrane pump, the sol may immediately be used for a coating operation. Following the drying of the coating (30 min at 80° C.), the thermal densification of the coating at temperatures of up to 600° C. in an atmosphere of $N_2$ or Ar is conducted. In this manner transparent and crack-free coatings having thicknesses of about 1 µm are obtained, the colors whereof may be adjusted between light brown to dark black, depending on the Pd concentration.

We claim:

1. A process for producing a vitreous layer containing a function carrier, on a substrate, comprising:

coating a substrate with a mixture comprising:
   (1) a composition prepared by hydrolyzing and polycondensing a mixture comprising:
      (A) at least one hydrolyzable silane of general formula (I)

$$SiX_4 \quad (I)$$

wherein the radicals X are the same or different and represent hydrolyzable groups or hydroxy groups; or an oligomer derived therefrom, and
      (B) at least one organosilane of general formula (II)

$$R^1_a R^2_b SiX_{(4-a-b)} \quad (II)$$

wherein $R^1$ is a non-hydrolyzable group, $R^2$ is different from $R^1$ and represents a radical carrying a functional group, X has the meaning given above, and a and b have the values 0, 1, 2 or 3, the sum (a+b) having the value 1, 2 or 3; or an oligomer derived therefrom, wherein a weight ratio of (A):(B) is 5–50:50–95,
   (2) at least one function carrier selected from the group consisting of temperature-stable dyes or pigments, oxides of metals or non-metals, coloring metal ions, colloids of metals or metal compounds, and metal ions capable of reacting to form metal colloids under reducing conditions;

thereby forming a coating; and
   thermally densifying said coating to form a layer comprising vitreous, completely inorganic glass.

2. The product produced by the process of claim 1.

3. The process of claim 1, wherein said mixture further comprises (C) one or more compounds of glass-forming elements.

4. The process of claim 1, wherein said composition is prepared by hydrolysis and polycondensation of a mixture of (A) said at least one hydrolyzable silane of general formula (I), (B) said at least one organosilane of general formula (II), and (2) said at least one function carrier.

5. The process of claim 1, wherein said at least one hydrolyzable silane (A) is a tetraalkoxysilane.

6. The process of claim 1, wherein said at least one organosilane (B) is an epoxysilane or aminosilane.

7. The process of claim 1, wherein said hydrolysis and polycondensation are carried out under conditions for a sol-gel process.

8. The process of claim 1, wherein said hydrolysis and polycondensation are carried out in the presence of a complexing agent.

9. The process of claim 1, wherein at least one function carrier is a temperature-stable dyestuff or a pigment selected from the group consisting of azo dyes, dispersed dyestuffs, perylene dyes, triphenylmethane dyes, vat dyes, fluorescent dyes, phthalocyanine and carbon black pigments.

10. The process of claim 1, wherein said at least one function carrier is a colored metal ion in the form of a water-soluble metal salt.

11. The process of claim 1, wherein said at least one function carrier has a particle diameter of from 1 to 100 nm.

12. The process of claim 11, wherein said at least one function carrier is selected from the group consisting of oxides, metal or metal compound colloids, metal halides, metal carbides, metal nitrides, metal arsenides, metal phosphides and metal chalcogenides.

13. The process of claim 1, wherein the substrate consists of metal, glass or ceramics.

14. The process of claim 1, wherein said thermally densifying is carried out at a temperature above 250° C., and is optionally preceded by drying said coating.

15. The process of claim 14, wherein said thermally densifying is carried out at a temperature above 400° C., and is optionally preceded by drying said coating.

* * * * *